US009087373B2

(12) United States Patent
Sohn et al.

(10) Patent No.: US 9,087,373 B2
(45) Date of Patent: Jul. 21, 2015

(54) COMPUTER-AIDED DIAGNOSIS METHOD AND COMPUTER-AIDED DIAGNOSIS APPARATUS THEREFOR

(71) Applicant: SAMSUNG ELECTRONICS CO., LTD., Suwon-si (KR)

(72) Inventors: Ki-won Sohn, Seoul (KR); Ho-kyung Kang, Seoul (KR); Young-yoon Lee, Suwon-si (KR); Young-ho Moon, Suwon-si (KR); Hae-kyung Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 13/678,695

(22) Filed: Nov. 16, 2012

(65) Prior Publication Data

US 2013/0129171 A1    May 23, 2013

(30) Foreign Application Priority Data

Nov. 23, 2011    (KR) ........................ 10-2011-0123115

(51) Int. Cl.
*G06K 9/00*    (2006.01)
*G06T 7/00*    (2006.01)
*G06T 5/00*    (2006.01)
*G06T 5/50*    (2006.01)
*A61B 6/00*    (2006.01)

(52) U.S. Cl.
CPC ............... *G06T 7/0014* (2013.01); *G06T 5/002* (2013.01); *G06T 5/50* (2013.01); *G06T 2207/10112* (2013.01); *G06T 2207/10116* (2013.01); *G06T 2207/10144* (2013.01); *G06T 2207/30064* (2013.01)

(58) Field of Classification Search
USPC ......... 382/100, 103, 128–134, 168, 173, 181, 382/199, 209, 190, 189, 219, 232, 254, 382/274–276, 287–291, 305, 312; 378/4, 8, 378/21
See application file for complete search history.

(56) References Cited

U.S. PATENT DOCUMENTS

| 6,240,201 | B1 * | 5/2001 | Xu et al. ........................ 382/130 |
| 7,545,956 | B2 * | 6/2009 | Miyahara ........................ 382/106 |
| 7,545,965 | B2 * | 6/2009 | Suzuki et al. .................. 382/128 |
| 7,796,795 | B2 * | 9/2010 | Uppaluri et al. ............... 382/128 |
| 7,903,855 | B2   | 3/2011 | Lin et al. |
| 8,233,692 | B2 * | 7/2012 | Merlet ........................... 382/132 |
| 2008/0212853 | A1 * | 9/2008 | Lin et al. ........................ 382/128 |

* cited by examiner

*Primary Examiner* — Seyed Azarian
(74) *Attorney, Agent, or Firm* — Sughrue Mion, PLLC

(57) ABSTRACT

A Computer-Aided Diagnosis (CAD) apparatus for correctly detecting a nodule is provided. The CAD apparatus includes an input device for receiving a first image captured by emitting X-rays towards a user and a second image that is discriminated from the first image and is an image of the user; an information acquisition device for acquiring a bone model of the user by using the second image; and a CAD device for compensating for the first image by using the bone model.

18 Claims, 9 Drawing Sheets
(5 of 9 Drawing Sheet(s) Filed in Color)

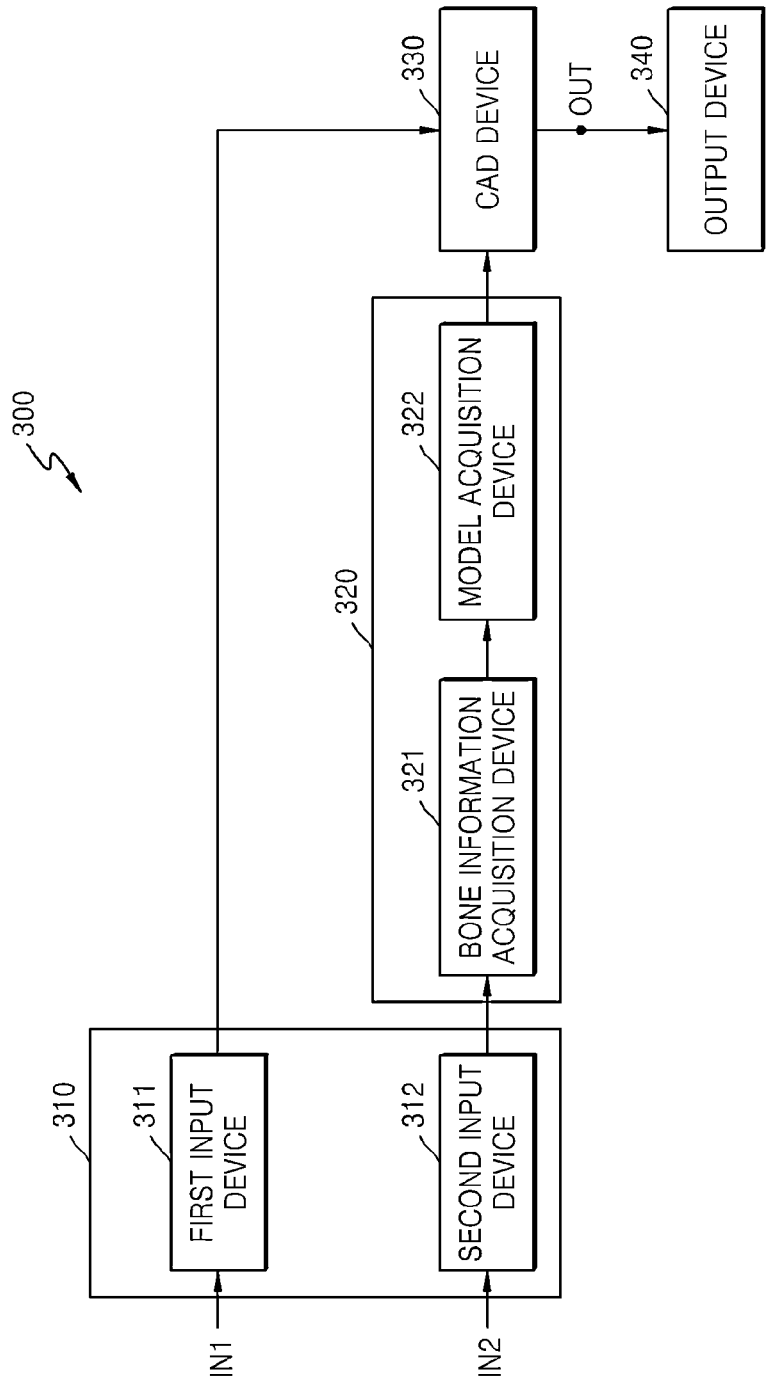

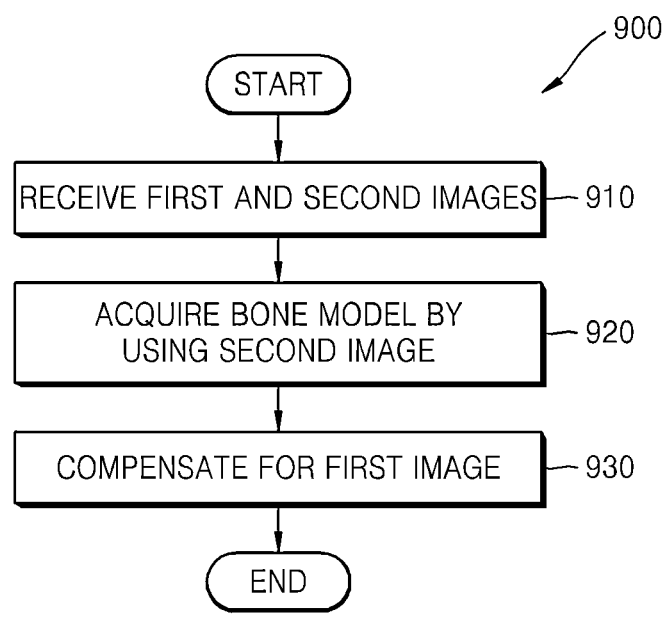

COMPUTER-AIDED DIAGNOSIS METHOD AND COMPUTER-AIDED DIAGNOSIS APPARATUS THEREFOR

CROSS-REFERENCE TO RELATED PATENT APPLICATION

This application claims priority from Korean Patent Application No. 10-2011-0123115, filed on Nov. 23, 2011, in the Korean Intellectual Property Office, the disclosure of which is incorporated herein in its entirety by reference.

BACKGROUND

1. Field

Methods and apparatuses consistent with the exemplary embodiments relate to a computer-aided diagnosis method and a computer-aided diagnosis apparatus therefor, and more particularly, to a computer-aided diagnosis method for correctly detecting a nodule in a human body and a computer-aided diagnosis apparatus therefor.

2. Description of the Related Art

Computer-Aided Diagnosis (CAD) systems are used to discover a nodule, such as a cancer, at an early stage from a medical digital X-ray image.

Related art CAD systems are not widely used due to low performance in image sensitivity and product specification, and accordingly, researches and developments for enhancing image sensitivity and product specification have been conducted.

The biggest reason for the low performance of CAD systems may be anatomical noise in a human body to be diagnosed by image capturing. The anatomical noise may include bones, soft tissues, and blood vessels. In detail, in an X-ray image, if anatomical noise exists in an area in which a nodule exists, the anatomical noise overlaps with the nodule, thereby making detecting the existence of the nodule difficult.

Thus, a CAD method and apparatus for correctly detecting the existence of a nodule should be provided.

SUMMARY

The exemplary embodiments provide a Computer-Aided Diagnosis (CAD) method for correctly detecting a nodule and a CAD apparatus therefor.

The exemplary embodiments also provide a CAD method for correctly detecting a nodule by detecting and removing anatomical noise including a bone and a CAD apparatus therefor.

According to an aspect of the exemplary embodiments, there is provided a Computer-Aided Diagnosis (CAD) apparatus including: an input device for receiving a first image captured by emitting X-rays towards a user and receiving a second image that is discriminated from the first image and is an image of the user; an information acquisition device for acquiring a bone model of the user by using the second image; and a CAD device for compensating for the first image by using the bone model.

The information acquisition device may acquire bone information that is information regarding at least one of a position and shape of a bone structure of the user from the second image, and acquire the bone model by using the bone information.

The CAD device may remove anatomical noise in the first image by matching the bone model with the first image.

The CAD device may detect a nodule from the first image from which the anatomical noise has been removed.

The information acquisition device may acquire a bone structure of the user from the second image, set at least one point in the bone structure, and generate the bone model including position information of the set at least one point.

The second image may include a Computed Tomography (CT) image of the user, and the information acquisition device may acquire the bone model corresponding to a bone structure of the user.

The second image may include a dual energy capturing image of the user, and the information acquisition device may acquire a bone structure of the user from a bone image included in the dual energy capturing image, set at least one point in the bone structure, and generate the bone model including position information of the set at least one point.

The second image may include a tomosynthesis image of the user, and the information acquisition device may acquire a bone structure of the user from a bone image included in the tomosynthesis image, set at least one point in the bone structure, and generate the bone model including position information of the set at least one point.

The CAD apparatus may further include an output device for displaying the compensated first image.

The first image may be a chest X-ray image captured by emitting X-rays towards a chest of the user, and the bone model may be a rib cage model of the user.

According to another aspect of the exemplary embodiments, there is provided a Computer-Aided Diagnosis (CAD) method for diagnosing a disease using a CAD apparatus, the CAD method including: receiving a first image captured by emitting X-rays towards a user and receiving a second image of the user that is discriminated from the first image; acquiring a bone model of the user by using the second image; and compensating for the first image by using the bone model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects will become more apparent by describing in detail exemplary embodiments thereof with reference to the attached drawings in which:

FIG. 3 is a block diagram of a CAD apparatus according to another exemplary embodiment of the application;

FIG. 9 is a flowchart illustrating a CAD method according to an exemplary embodiment of the application.

DETAILED DESCRIPTION OF THE EXEMPLARY EMBODIMENTS

In detail, the present application provides an apparatus and method for detecting a nodule from a chest X-ray image.

When the chest X-ray image is read to detect a nodule, a rib cage may hide the nodule, thereby decreasing a possibility of detecting the nodule, e.g., a lung nodule.

In addition, it is difficult to correctly determine a shape and position of the rib cage only with the chest X-ray image.

Thus, the present application provides a Computer-Aided Diagnosis (CAD) apparatus capable of increasing a nodule detection performance by correctly acquiring a rib cage of a user from which the nodule is detected. Hereinafter, a CAD method for increasing a nodule detection performance according to an exemplary embodiment and a CAD apparatus therefor are described in detail with reference the accompanying drawings.

Expressions such as "at least one of," when preceding a list of elements, modify the entire list of elements and do not modify the individual elements of the list.

Figure 1:
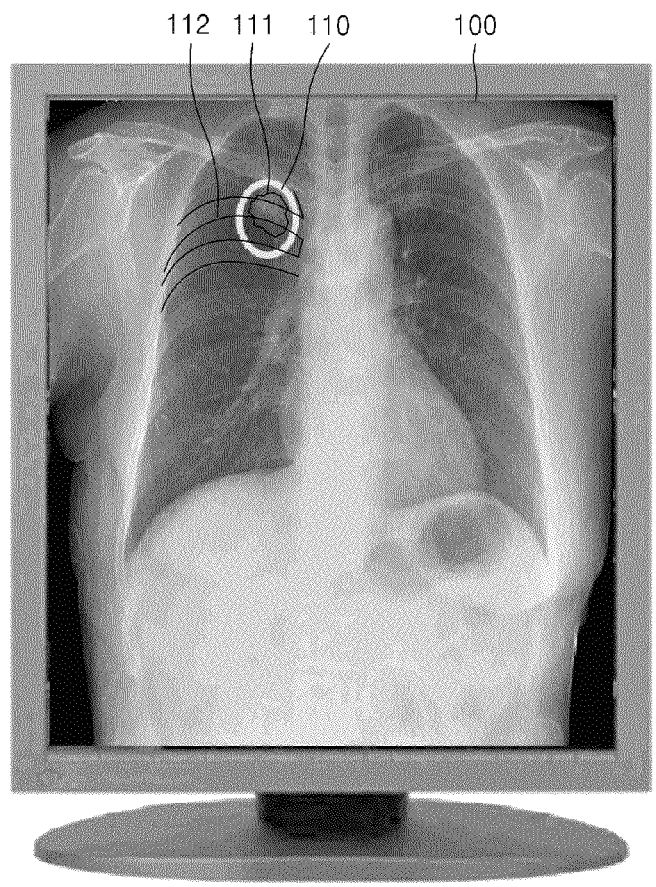
FIG. 1 is an X-ray image.

FIG. 1 is an X-ray image 100.

Referring to FIG. 1, the X-ray image 100 is captured by emitting X-rays, radioactive rays, towards a chest of a user. The X-ray image 100 includes bones, blood vessels, and soft tissues of the human body.

A rib cage 112 is above an area 110 in which a nodule 111 exists. The rib cage 112 disturbs detection of the nodule 111, and is noise in the X-ray image 100 from which the nodule 111 is supposed to be detected. Thus, it is difficult to separately extract the rib cage 112 from the X-ray image 100.

Figure 2A:
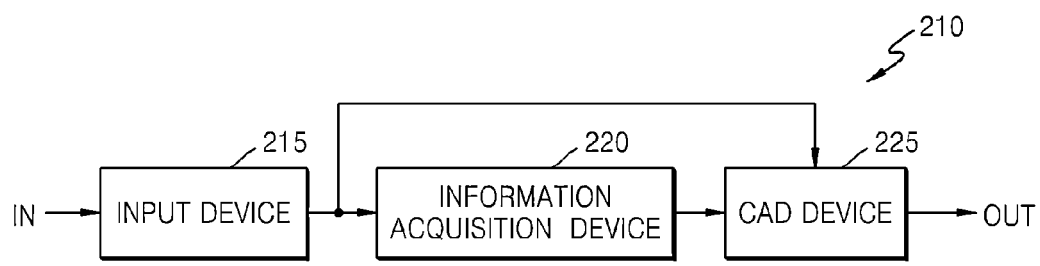
FIGS. 2A and 2B are block diagrams of Computer-Aided Diagnosis (CAD) apparatuses according to exemplary embodiments of the application.
Figure 2B:
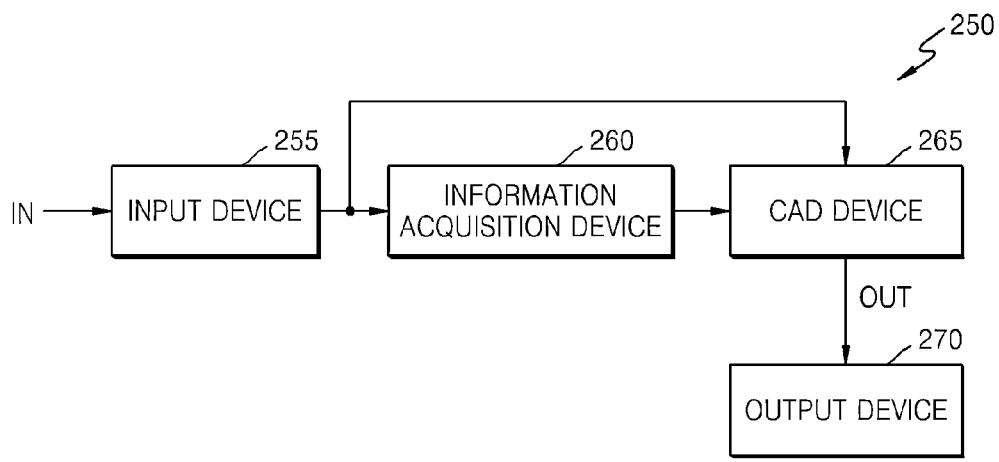

FIGS. 2A and 2B are block diagrams of CAD apparatuses according to the exemplary embodiments of the application. FIG. 2A is a block diagram of a CAD apparatus 210 according to an exemplary embodiment, and FIG. 2B is a block diagram of a CAD apparatus 250, according to another exemplary embodiment.

Referring to FIG. 2A, the CAD apparatus 210 includes an input device 215, an information acquisition device 220, and a CAD device 225.

The input device 215 receives a first image captured by emitting X-rays towards a user, and a second image that is discriminated from the first image and is an image of the user.

Although it is illustrated in FIG. 2A that the input device 215 receives an input signal IN including the first image and the second image, the input device 215 may capture and generate the first image and the second image itself and output the first image and the second image to the information acquisition device 220. For example, the input device 215 may include an X-ray capturing camera (not shown) and a second image capturing camera (not shown) and may generate the first image with the X-ray capturing camera and the second image with the second image capturing camera.

The information acquisition device 220 acquires a bone model of the user by using the second image input from the input device 215. The bone model is obtained by reproducing a bone structure of the user captured in the first image. The information acquisition device 220 may extract or acquire the bone structure of the user who is a capturing object of the first image from the second image discriminated from the first image.

The information acquisition device 220 may acquire bone information that is information regarding at least one of a position and shape of the bone structure of the user from the second image and generate the bone model by using the bone information. An operation of the information acquisition device 220 for generating the bone model is described in more detail below with reference to FIGS. 5A to 8C.

The CAD device 225 compensates for the first image by using the bone model acquired by the information acquisition device 220. In detail, the CAD device 225 may remove anatomical noise in the first image by matching the bone model acquired by the information acquisition device 220 with the first image. The anatomical noise indicates a human tissue, such as a bone, obstructing detection of a nodule from an X-ray image. The CAD device 225 outputs a diagnosis image OUT from which the anatomical noise in the first image has been removed.

The CAD device 225 may detect a nodule from the diagnosis image OUT corresponding to the first image from which the anatomical noise has been removed. The detection of the nodule from the first image from which the anatomical noise has been removed may cause detection accuracy to increase compared with a case of detecting the nodule from the original first image.

Referring to FIG. 2B, the CAD apparatus 250 further includes an output device 270, compared to the CAD apparatus 210 shown in FIG. 2A.

Since an input device 255, an information acquisition device 260, a CAD device 265 in FIG. 2B correspond to the input device 215, the information acquisition device 220, and the CAD device 225 in FIG. 2A, respectively, repeated descriptions thereof are omitted.

The output device 270 displays the diagnosis image OUT that is the compensated first image. In detail, the output device 270 includes a display panel (not shown) to display the diagnosis image OUT through the display panel so that the user visually recognizes the diagnosis image OUT.

FIG. 3 is a block diagram of a CAD apparatus 300 according to another exemplary embodiment.

Referring to FIG. 3, the CAD apparatus 300 includes an input device 310, an information acquisition device 320, and a CAD device 330. The CAD apparatus 300 may further include an output device 340.

Since the input device 310, the information acquisition device 320, and the CAD device 330 included in the CAD apparatus 300 correspond to the input device 215, the information acquisition device 220, and the CAD device 225 included in the CAD apparatus 210, respectively, and the output device 340 of FIG. 3 corresponds to the output device 270 of FIG. 2B, repeated descriptions thereof are omitted.

The input device 310 includes a first input device 311 and a second input device 312.

The first input device 311 receives a first image IN1 captured by emitting X-rays towards a user. Although it is illustrated in FIG. 3 that the first input device 311 receives the first image IN1, the first input device 311 may include an X-ray capturing camera (not shown) to generate the first image IN1 itself.

The second input device 312 receives a second image IN2 that is discriminated from the first image IN1 and is an image obtained by capturing the user. Although it is illustrated in FIG. 3 that the second input device 312 receives the second image IN2, the second input device 312 may include a second image capturing camera (not shown) to generate the second image IN2 itself. The second image IN2 is an image of the user who is a capturing object of the first image IN1, and may include at least one of a Computed Tomography (CT) image, a dual energy capturing image, and a tomosynthesis image. The second image IN2 may also include an image captured in another capturing scheme.

The first image IN1 and the second image IN2 may be an image obtained by capturing a chest area of the user.

The input device 310 transmits the first image IN1 to the CAD device 330 and transmits the second image IN2 to the information acquisition device 320.

The information acquisition device 320 may acquire a bone structure of the user from the second image IN2, set at least one point in the second image IN2, and generate a bone model including position information of the set at least one point. The bone model will be described in detail with reference to FIGS. 4A to 6.

In detail, the information acquisition device 320 may include a bone information acquisition device 321 and a model acquisition device 322.

The bone information acquisition device 321 acquires bone information that comprises information regarding at least one of a position and shape of the bone structure of the user.

The model acquisition device 322 may acquire the bone model by using the bone information output from the bone information acquisition device 321.

A detailed operation of the information acquisition device 320 is described in detail below with reference to FIGS. 4A to 4C.

The CAD device 330 compensates for the first image IN1 by using the bone model transmitted from the model acquisition device 322. In detail, the CAD device 330 outputs a read image OUT in which it is easy to detect a nodule by removing anatomical noise in the first image IN1.

Figure 4A:
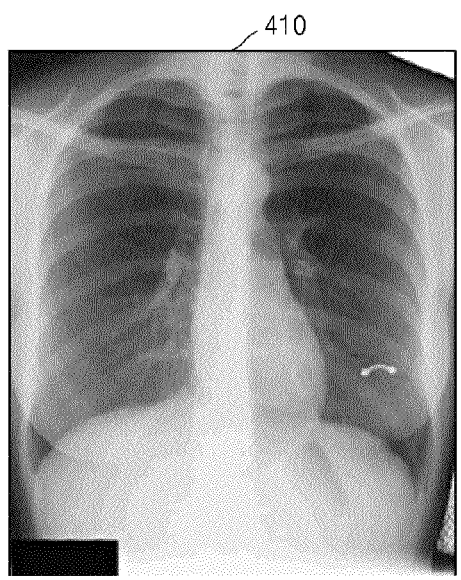
FIGS. 4A to 4C are diagrams for describing an operation of the CAD apparatus of FIG. 3.
Figure 4B:
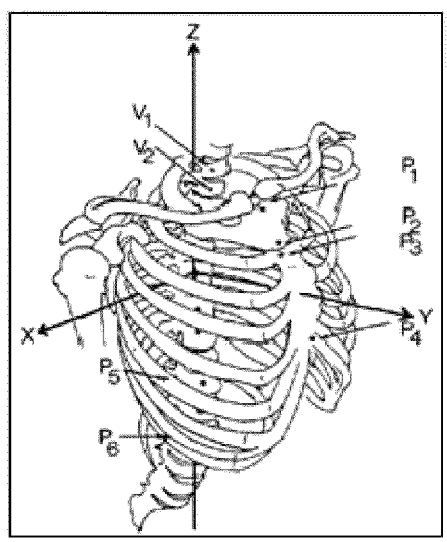
Figure 4C:
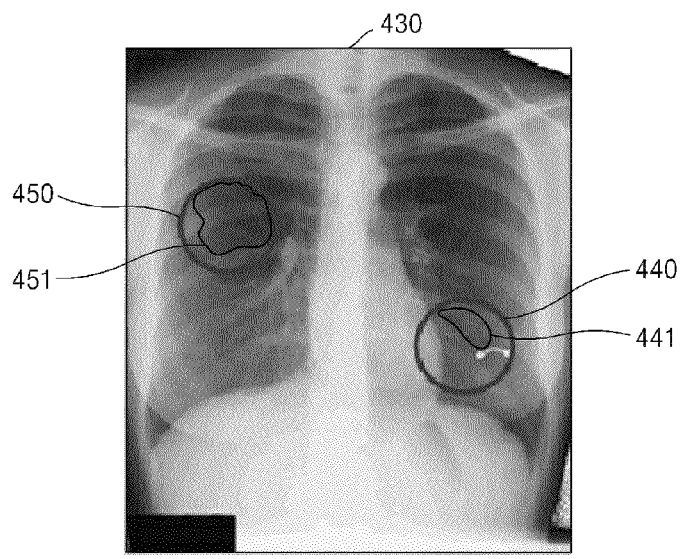

FIGS. 4A to 4C are diagrams for describing an operation of the CAD apparatus 300 of FIG. 3.

FIG. 4A illustrates the first image IN1 input to the first input device 311, FIG. 4B illustrates the bone model acquired by the model acquisition device 322, and FIG. 4C illustrates the read image OUT output from the CAD device 330.

Referring to FIG. 4A, an X-ray image 410 that is the first image IN1 obtained by capturing the chest of the user is output from the first input device 311 and transmitted to the CAD device 330.

Referring to FIG. 4B, the information acquisition device 320 acquires bone information that is information regarding at least one of a position and shape of a bone structure of the user from the second image IN2 and generates a bone model by using the bone information.

The bone model shown in FIG. 4B may include position information of the bone structure of the user. The information acquisition device 320 extracts a bone structure from the second image IN2. Alternatively, the information acquisition device 320 may predict and generate a bone structure from an image related to bones included in the second image IN2. The information acquisition device 320 may set at least one point V1, V2, P1, P2, P3, P4, P5, and P6 in the extracted or generated bone structure and generate a bone model including position information of the set at least one point V1, V2, P1, P2, P3, P4, P5, and P6.

The position information included in the bone model may be information obtained by expressing the at least one point V1, V2, P1, P2, P3, P4, P5, and P6 existing on the bone structure as coordinates when the bone structure is three-dimensionally modeled. For example, when a predetermined point on the bone structure is set as a central point (0, 0, 0) of x-, y-, and z-axes, coordinate values corresponding to the at least one point V1, V2, P1, P2, P3, P4, P5, and P6 may be generated based on the set central point (0, 0, 0). Accordingly, the bone model shown in FIG. 4B may include position information of the bone structure and predetermined points on the bone structure.

The CAD device 330 compensates for anatomical noise in the first image IN1 by matching the bone model with the first image IN1. In detail, the CAD device 330 may remove a bone image from the first image IN1 by matching the bone model with the first image IN1 based on a position.

Referring to FIG. 4C, the CAD device 330 may adjust brightness of a rib cage to clearly view nodules 441 and 451 at points 440 and 450.

Figure 5A:
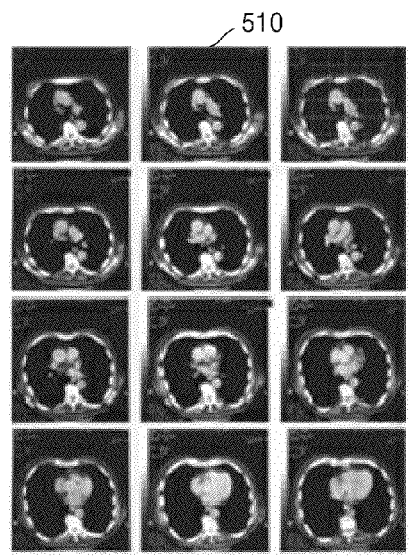
FIGS. 5A to 5C are images for describing another operation of the CAD apparatus of FIG. 3.
Figure 5B:
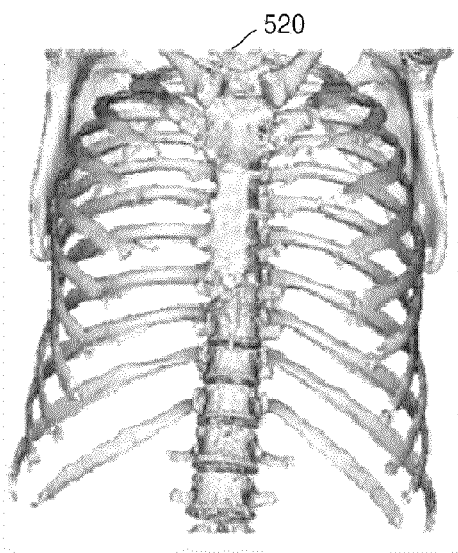
Figure 5C:
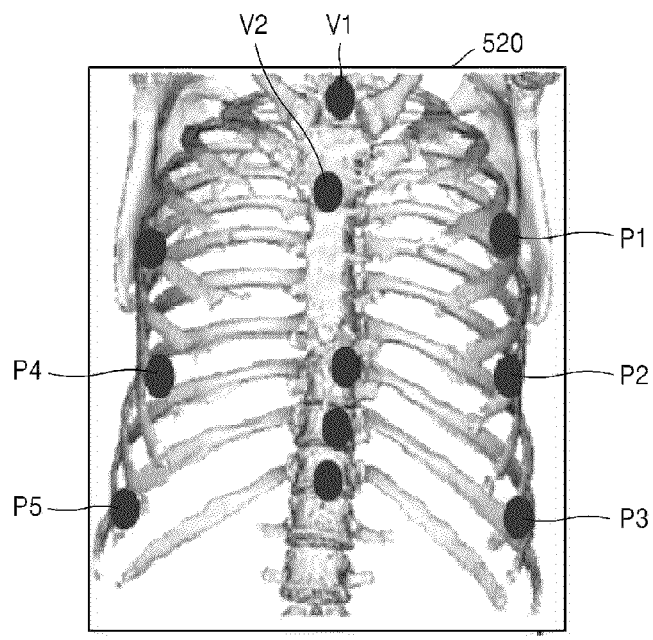

FIGS. 5A to 5C are images for describing another operation of the CAD apparatus 300 of FIG. 3. In detail, FIGS. 5A to 5C are diagrams for describing an operation of the information acquisition device 320 when the second image IN2 is a CT image.

FIG. 5A illustrates a CT image 510 that is the second image IN2, FIG. 5B illustrates a bone structure reproduced by using the second image IN2, and FIG. 5C illustrates that at least one point is set on the bone structure.

Referring to FIG. 5A, the CT image 510 is obtained by capturing the chest of the user. The CT image 510 is transmitted as the second image IN2 from the input device 310 to the information acquisition device 320.

Referring to FIG. 5B, the information acquisition device 320 generates a rib cage structure 520 that is a bone structure of the chest by using the CT image 510. In detail, the bone information acquisition device 321 may acquire information regarding at least one of a position and shape of a rib cage included in the CT image 510 and may generate a bone structure by using the acquired information. Since embodying the rib cage structure 520 using the CT image 510 is disclosed in the paper issued in the Society for Photographic and Instrumentation Engineers (SPIE) 2010 by Lee and Reeves, a detailed description thereof is omitted herein.

Referring to FIG. 5C, the information acquisition device 320 sets at least one point V1, V2, P1, P2, P3, P4, and P5 on the bone structure 520. The at least one point V1, V2, P1, P2, P3, P4, and P5 may be reference points for matching a bone model with the first image IN1.

Figure 6:
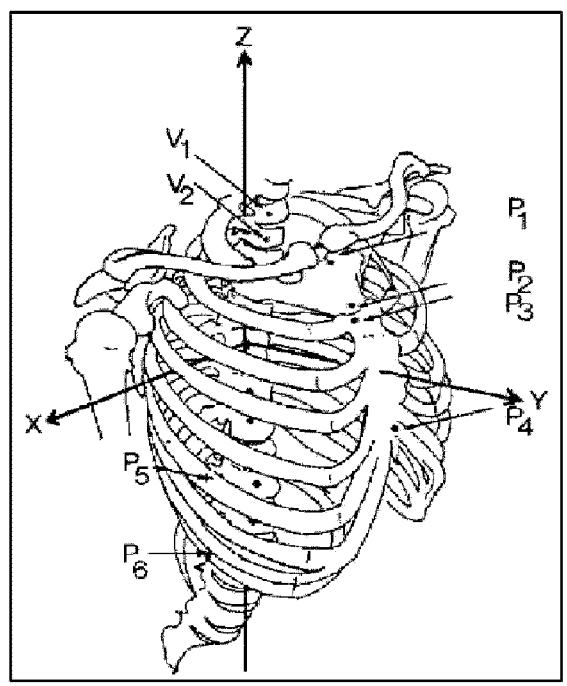
FIG. 6 is a diagram for describing a bone model acquired by an information acquisition device in the CAD apparatus of FIG. 3.

FIG. 6 is a diagram for describing a bone model acquired by the information acquisition device 320 in the CAD apparatus 300 of FIG. 3.

Referring to FIG. 6, the information acquisition device 320 may generate a bone model including position information, e.g., coordinate information, by using the bone structure 520, as shown in FIG. 5C, on which the at least one point V1, V2, P1, P2, P3, P4, and P5 are set. In detail, the model acquisition device 322 may generate a rib cage model that is a bone structure existing in the chest.

Figure 7A:
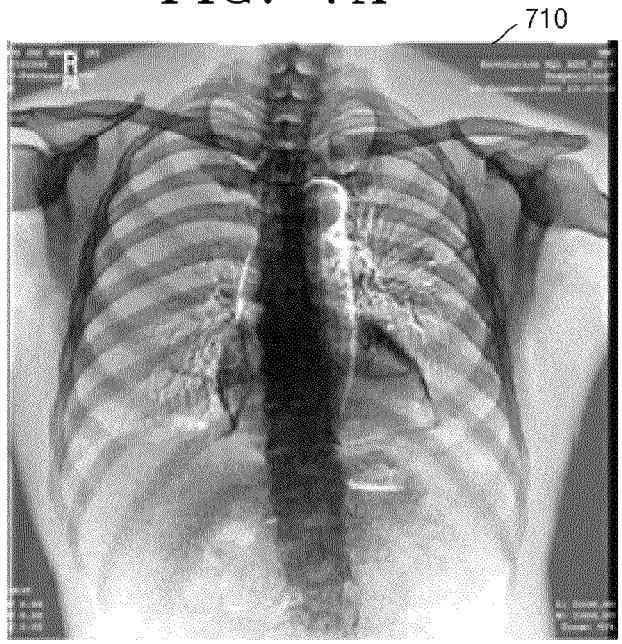
FIGS. 7A and 7B are images for describing another operation of the CAD apparatus of FIG. 3.
Figure 7B:
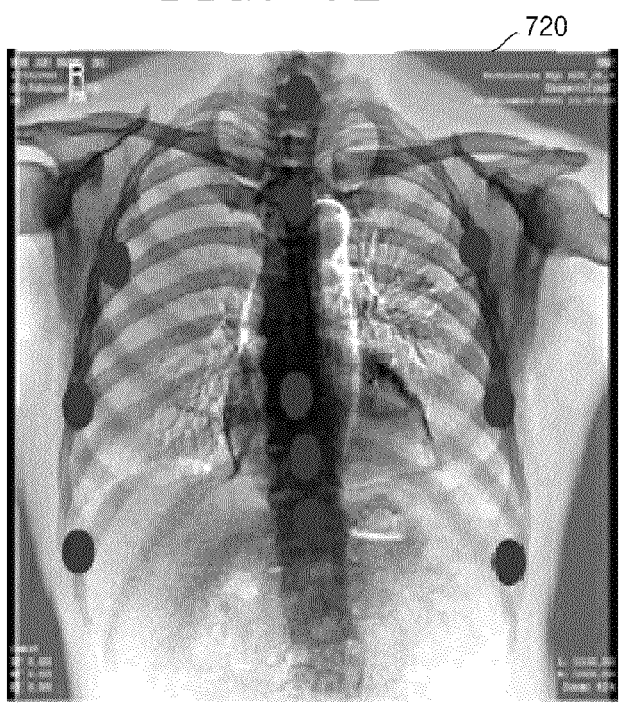

FIGS. 7A and 7B are images for describing another operation of the CAD apparatus 300 of FIG. 3. In detail, FIGS. 7A and 7B are diagrams for describing an operation of the information acquisition device 320 when the second image IN2 is a dual energy capturing image. The dual energy capturing image indicates an image including an image captured by emitting high-energy X-rays and an image captured by emitting low-energy X-rays when an X-ray image is captured by emitting radioactive rays towards a chest.

When the chest is captured by emitting high-energy X-rays, an image in which soft tissues excluding bones are clearly viewed is generated. In addition, when the chest is captured by emitting low-energy X-rays, an image in which bones are clearly viewed is generated.

FIG. 7A illustrates an image 710 captured by emitting low-energy X-rays among the dual energy capturing image. The input device 310 transmits the image 710 to the information acquisition device 320.

FIG. 7B illustrates that at least one point is set on the image 710. The information acquisition device 320 may set points for marking positions in the image 710 in the same manner as described with reference to FIG. 5C. Since setting predetermined points in the image 710 is the same as described with reference to FIG. 5C, a detailed description thereof is omitted herein.

The information acquisition device 320, specifically, the model acquisition device 322 of the information acquisition device 320, may embody the bone model described in FIG. 6 by using an image 720 in which predetermined points are set.

Figure 8A:
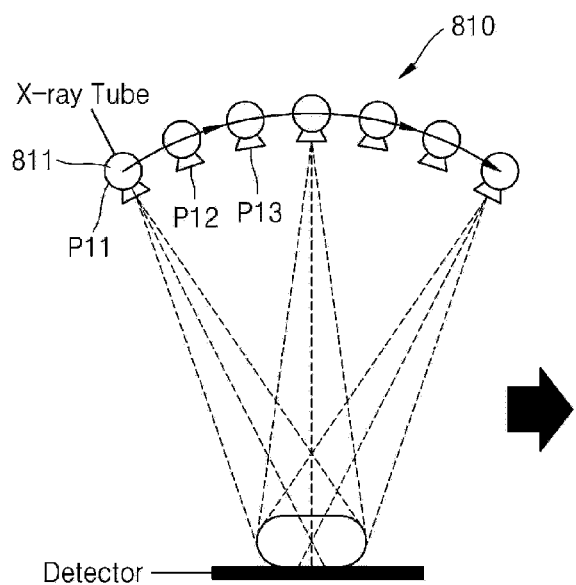
FIGS. 8A to 8C are diagrams for describing another operation of the CAD apparatus of FIG. 3.
Figure 8B:
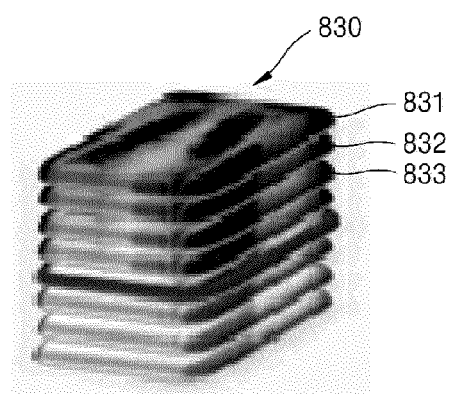
Figure 8C:
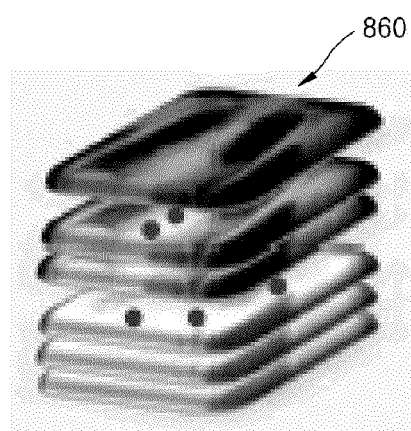

FIGS. 8A to 8C are diagrams for describing another operation of the CAD apparatus 300 of FIG. 3. In detail, FIGS. 8A to 8C are diagrams for describing an operation of the information acquisition device 320 when the second image IN2 is a tomosynthesis image. FIG. 8A illustrates how to capture a tomosynthesis image, FIG. 8B illustrates a plurality of images generated by capturing the tomosynthesis image, and FIG. 8C illustrates that a bone structure is embodied and predetermined points are set by using the tomosynthesis image.

Referring to FIG. 8A, a tomosynthesis image capturing device 810 captures a user who is a capturing object by placing the user on a detector and moving a position of an X-ray tube 811.

In detail, the user is captured while moving the X-ray tube 811 to points P11, P12, and P13.

Referring to FIG. 8B, a plurality of images are captured by using the tomosynthesis image capturing device 810. In detail, a tomosynthesis image 830 includes a plurality of images 831, 832, and 833 corresponding to various capturing points P11, P12, and P13, respectively.

A bone structure may be generated by using the plurality of images 831, 832, and 833 of the tomosynthesis image 830.

Referring to FIG. 8C, the information acquisition device 320 generates a three-dimensional bone structure image 860 and sets predetermined points in the bone structure image 860. Since setting the predetermined points is the same as described in FIG. 5C, a detailed description thereof is omitted herein.

As described above with reference to FIGS. 5A to 8C, by using the first image IN1, which is an X-ray image, and an image different from the first image IN1, a bone structure or a bone model of the user may be correctly extracted. That is, according to the present application, an affection of anatomical noise in an X-ray image may be reduced by generating a bone model using an image obtained by capturing the same user and compensating for an image of a bone included in the first image IN1, that is an X-ray image, by using the generated bone model. Accordingly, accuracy of reading a nodule using X-rays may increase.

FIG. 9 is a flowchart illustrating a CAD method 900 according to an exemplary embodiment. The CAD method 900 may be performed by the CAD apparatus 210, 250, or 300 according to an exemplary embodiment and has the same technical spirit as that of an operation of the CAD apparatus 210, 250, or 300 according to an exemplary embodiment. Thus, the description made in FIGS. 2A to 8C is not repeated herein. Hereinafter, the CAD method 900 will now be described with reference to the CAD apparatus 300 according to another exemplary embodiment.

Referring to FIG. 9, in operation 910, a first image IN1, captured by emitting X-rays towards a user, and a second image IN2, that is discriminated from the first image IN1 and is an image of the user, are received. Operation 910 may be performed by the input device 310.

In operation 920, a bone model of the user is acquired by using the second image IN2. Operation 920 may be performed by the information acquisition device 320, in detail, the bone information acquisition device 321.

In detail, in operation 920, bone information that is information regarding at least one of a position and shape of a bone structure of the user is acquired from the second image IN2. The bone model may be acquired by using the acquired bone information.

Alternatively, in operation 920, the bone structure of the user may be acquired from the second image IN2, at least one point may be set on the bone structure, and the bone model including position information of the at least one set point may be generated.

In operation 930, the first image IN1 is compensated for by using the bone model generated in operation 920. Operation 930 may be performed by the information acquisition device 320, or specifically, the model acquisition device 322 of the information acquisition device 320.

In detail, operation 930 may include removing anatomical noise in the first image IN1 by matching the bone model generated in operation 920 with the first image IN1 (although not shown).

The CAD method 900 may further include detecting a nodule from the first image IN1 from which the anatomical noise has been removed (although not shown).

The CAD method 900 may further include displaying a diagnosis image OUT that is the compensated first image generated in operation 930 (although not shown).

While the application has been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A Computer-Aided Diagnosis (CAD) apparatus comprising:
    an input device which receives a first image of a user captured by emitting X-rays towards the user, and receives a second image of the user that is discriminated from the first image;
    an information acquisition device which acquires a bone model of the user based on the second image; and
    a CAD device for compensating for the first image based on the bone model,
    wherein the information acquisition device acquires information of at least one of a position of a bone of the user and a shape of the bone of the user, and generates the bone model based on the position of the bone or the shape of the bone,
    wherein the information acquisition device acquires a bone structure of the user from the second image, sets at least one point in the bone structure, and generates the bone model including position information of the set at least one point, and
    wherein the second image includes a tomosynthesis image of the user.

2. The CAD apparatus of claim 1, wherein the information acquisition device acquires bone information regarding at least one of a position and shape of a bone structure of the user from the second image, and acquires the bone model based on the bone information.

3. The CAD apparatus of claim 1, wherein the CAD device removes anatomical noise in the first image by matching the bone model with the first image.

4. The CAD apparatus of claim 3, wherein the CAD device detects a nodule from the first image from which the anatomical noise has been removed.

5. The CAD apparatus of claim 1, wherein the second image includes a Computed Tomography (CT) image of the user, and
    the information acquisition device acquires the bone model corresponding to the bone structure of the user.

6. The CAD apparatus of claim 1, wherein the second image includes a dual energy capturing image of the user, and the information acquisition device acquires the bone structure of the user from a bone image included in the dual energy capturing image, sets the at least one point in the bone structure, and generates the bone model including the position information of the set at least one point.

7. The CAD apparatus of claim 1, wherein
the information acquisition device acquires the bone structure of the user from a bone image included in the tomosynthesis image, sets the at least one point in the bone structure, and generates the bone model including the position information of the set at least one point.

8. The CAD apparatus of claim 1, further comprising an output device which displays the compensated first image.

9. The CAD apparatus of claim 1, wherein the first image is a chest X-ray image captured by emitting X-rays towards a chest of the user, and
the bone model is a rib cage model of the user.

10. A Computer-Aided Diagnosis (CAD) method for diagnosing a disease using a CAD apparatus, the CAD method comprising:
receiving a first image of a user captured by emitting X-rays towards the user, and receiving a second image of the user that is discriminated from the first image;
acquiring a bone model of the user based on the second image; and
compensating for the first image by using the bone model,
wherein information is acquired of at least one of a position of a bone of the user and a shape of the bone of the user, and the bone model is acquired based on the position of the bone or the shape of the bone, and
wherein the acquiring of the bone model of the user comprises:
acquiring a bone structure of the user from the second image;
setting at least one point in the bone structure; and
generating the bone model including position information of the set at least one point,
wherein the second image includes a tomosynthesis image of the user.

11. The CAD method of claim 10, wherein the acquiring of the bone model of the user comprises:
acquiring bone information regarding at least one of a position and shape of a bone structure of the user from the second image; and
acquiring the bone model based on the bone information.

12. The CAD method of claim 10, wherein the compensating of the first image comprises removing anatomical noise in the first image by matching the bone model with the first image.

13. The CAD method of claim 12, further comprising detecting a nodule from the first image from which the anatomical noise has been removed.

14. The CAD method of claim 10, wherein the second image further includes at least one of a Computed Tomography (CT) image of the user and a dual energy capturing image of the user.

15. The CAD method of claim 10, further comprising displaying the compensated first image.

16. The CAD method of claim 10, wherein the first image is a chest X-ray image captured by emitting X-rays towards a chest of the user.

17. A computer-aided apparatus (CAD) for diagnosing a disease, the apparatus comprising:
a first input device which receives a first image of a user captured by emitting X-rays towards the user;
a second input device which receives a second image of the user;
a bone information acquisition device which acquires bone information from the second image;
a model acquisition device which acquires a bone model based on the acquired bone information, and
a CAD unit which compensates for the first image based on the bone model,
wherein the model acquisition device acquires information of at least one of a position of a bone of the user and a shape of the bone of the user, and generates the bone model based on the position of the bone or the shape of the bone,
wherein the information acquisition device acquires a bone structure of the user from the second image, sets at least one point in the bone structure, and generates the bone model including position information of the set at least one point, and
wherein the second image includes a tomosynthesis image of the user.

18. The apparatus of claim 17, wherein the second image comprises an image of the user who is a capturing object of the first image, and further includes at least one of a Computed Tomography (CT) image and a dual energy capturing image.

* * * * *